US012749050B2

(12) United States Patent
Ogawa et al.

(10) Patent No.: US 12,749,050 B2
(45) Date of Patent: Sep. 29, 2026

(54) MANAGEMENT DEVICE AND MANAGEMENT PROGRAM

(71) Applicant: LIXIL Corporation, Tokyo (JP)

(72) Inventors: Shoji Ogawa, Tokyo (JP); Hiroki Shigetomo, Tokyo (JP); Toshiki Hashida, Tokyo (JP); Yusuke Namai, Tokyo (JP); Masanori Makihara, Tokyo (JP)

(73) Assignee: LIXIL Corporation, Tokyo (JP)

( * ) Notice: Subject to any disclaimer, the term of this patent is extended or adjusted under 35 U.S.C. 154(b) by 217 days.

(21) Appl. No.: 18/700,246

(22) PCT Filed: Sep. 21, 2022

(86) PCT No.: PCT/JP2022/035215

§ 371 (c)(1),
(2) Date: Apr. 10, 2024

(87) PCT Pub. No.: WO2023/063042

PCT Pub. Date: Apr. 20, 2023

(65) Prior Publication Data

US 2025/0021945 A1 Jan. 16, 2025

(30) Foreign Application Priority Data

Oct. 13, 2021 (JP) ................................ 2021-168010

(51) Int. Cl.

| | |
|---|---|
| ***G06Q 10/00*** | (2026.01) |
| ***G06Q 10/20*** | (2023.01) |
| ***G06Q 30/04*** | (2012.01) |

(52) U.S. Cl.

CPC ............ *G06Q 10/20* (2013.01); *G06Q 30/04* (2013.01)

(58) Field of Classification Search

CPC ......... G06Q 10/20; G06Q 30/04; G06Q 50/10
See application file for complete search history.

(56) References Cited

U.S. PATENT DOCUMENTS

2015/0177917 A1* 6/2015 Hoekstra ................ G06Q 10/10 715/771
2015/0234923 A1* 8/2015 Ferrara .................. G06F 16/13 707/782
2020/0217057 A1 7/2020 Spiro

FOREIGN PATENT DOCUMENTS

JP 2003-242230 A 8/2003
JP 2008-59492 A 3/2008
WO 2020/028798 A1 2/2020

* cited by examiner

*Primary Examiner* — Rokib Masud
(74) *Attorney, Agent, or Firm* — Morrison & Foerster LLP

(57) ABSTRACT

A management device includes a controller that acquires information on a toilet bowl device or the installation location of the toilet bowl device and manages at least one of inspection, repair, and replacement of the toilet bowl device based on information acquired.

6 Claims, 6 Drawing Sheets

MANAGEMENT DEVICE AND MANAGEMENT PROGRAM

CROSS-REFERENCE TO RELATED APPLICATIONS

This application is a national stage application under 35 USC 371 of International Application No. PCT/JP2022/035215, filed Sep. 21, 2022, which claims the priority of Japanese Application No. 2021-168010, filed Oct. 13, 2021. The entire contents of each priority application is incorporated herein by reference.

FIELD OF THE DISCLOSURE

The present disclosure relates to a management device and a management program for managing toilet bowl devices.

BACKGROUND OF THE DISCLOSURE

Toilets are essential facilities both in residences where people live and in facilities used by people. Since these facilities are prone to stains and odors, management for maintaining the cleanliness of toilets is an important key to making homes and facilities comfortable spaces. In particular, toilets installed in commercial facilities, entertainment facilities, multi-purpose facilities, passenger station facilities, and the like that are used by a large number of people need to be properly maintained and managed from the viewpoint of public health.

In the event of a malfunction of a toilet installed in a facility, for example, the following procedure is taken. First, the first discoverer, who is a user of the toilet, contacts the facility managers. After the facility managers confirm the malfunction, if they determine that it cannot be repaired by themselves, they look up the contact information of the toilet manufacturer and contact them. If the repairman of the manufacturer of the toilet confirms the malfunction event and determines that the toilet needs to be repaired or replaced, they submit a repair estimate to the facility managers. The facility managers review the repair estimate and submit the repair estimate to the facility owner. The facility owner reviews the repair estimate, makes an approval decision, and notifies the facility managers of the details of the payment. The facility managers order the toilet manufacturer for repair based on the details of the payment. The toilet manufacturer performs repairs based on the order and submits an invoice to the facility managers. The facility managers conduct an acceptance inspection, and the facility owner makes a payment to the toilet manufacturer.

SUMMARY OF THE DISCLOSURE

As described, it takes a lot of time, effort, and cost to properly repair and maintain and manage faulty toilets. In some cases, toilets of multiple manufacturers are mixed in one facility, and in that case, it is necessary to contact different contacts depending on the manufacturer of faulty toilets, which can further complicate the procedure. In order to reduce the burden on facility manager, it is desirable to provide services that support the proper management of toilets.

The present disclosure addresses the issue described above, and a purpose thereof is to provide a technology for properly managing toilet bowl devices.

In order to solve the above problem, a management device according to one aspect of the present disclosure includes: a toilet information acquisition unit that acquires information on a toilet bowl device or the installation location of the toilet bowl device; and a management unit that manages at least one of inspection, repair, and replacement of the toilet bowl device based on information acquired by the toilet information acquisition unit.

Incidentally, optional combinations of the aforementioned constituting elements and implementations of the present disclosure in the form of methods, apparatuses, systems, recording mediums, and computer programs may also be practiced as additional aspects of the present disclosure.

DETAILED DESCRIPTION OF THE DISCLOSURE

As an embodiment of the present disclosure, a technology for managing toilet bowl devices installed in a facility or the like will be described. The management device according to the present embodiment provides a service for managing inspection, repair, replacement, cleaning, and the like of toilet bowl devices installed in a facility and the like. In providing the service, the management device acquires information on the toilet bowl devices, information on the installation location of the toilet bowl devices, and the like in advance, and manages the inspection, repair, replacement, cleaning, etc. of the toilet bowl devices based on the acquired information. For example, depending on the attributes of users of the facility and the repair history of the toilet bowl devices, the toilet bowl devices are inspected, repaired, replaced, cleaned and the like with appropriate details and frequency.

The provider of the service according to the present embodiment performs inspection, repair, replacement, cleaning, etc., of the toilet bowl devices for a fixed fee for a predetermined period of time. Thereby, the manager of the facility can entrust the management of the toilet bowl devices to the service provider, and the labor required for the management of the toilet bowl devices can thus be reduced. Further, since no additional costs are required, the cost required for the management of the toilet bowl devices can be reduced. In addition, since the cost required for the management of the toilet bowl devices can be known in advance, the operation risk can be reduced.

Figure 1:
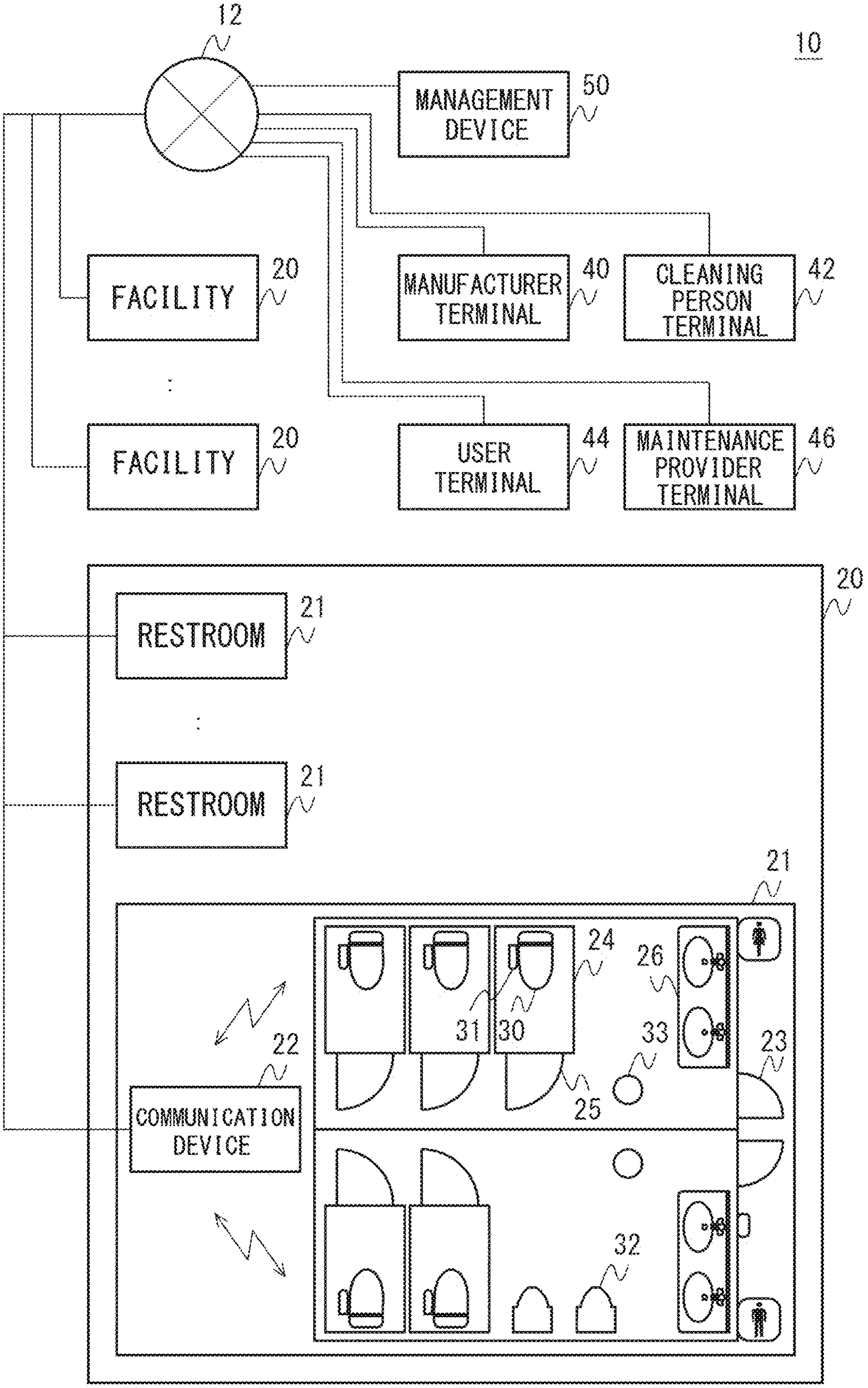
FIG. 1 is a diagram showing the configuration of a management system according to an embodiment.

FIG. 1 shows the configuration of a management system according to the embodiment. A management system 10 includes a management device 50 for managing a plurality of toilet bowl devices 30 installed in a restroom 21 of a facility 20, a communication device 22 that transmits detection information detected by a sensor 33 installed in the toilet bowl devices or in the restroom 21 to the management device 50, a manufacturer terminal 40 of the manufacturer of the toilet bowl devices 30, a cleaning person terminal 42 of a cleaning person in charge of cleaning the restroom 21, a user terminal 44 of a service user, a maintenance provider terminal 46 of a maintenance provider responsible for inspection, repair, replacement, etc., of the equipment or devices installed inside or around the toilet bowl devices 30 or the restroom 21, and Internet 12, which is an example of a communication means for performing communication among these devices.

The facility 20 is provided with one or more restrooms 21. A restroom 21 has a door 23 of the restroom 21, a sink 26, one or more private stalls 24, a door 25 of each of the private stalls 24, a toilet bowl device 30 installed in each of the private stalls 24, and a controller 31 for a user of a toilet bowl device 30 to enter an operation instruction to the toilet bowl device 30, as well as urinals 32 installed in a restroom 21 for men. The toilet bowl devices 30 may be Japanese-style toilet bowl devices or Western-style toilet bowl devices. The toilet bowl devices 30 including the urinals 32 are hereinafter collectively referred to as "toilet bowl devices 30."

Figure 2:
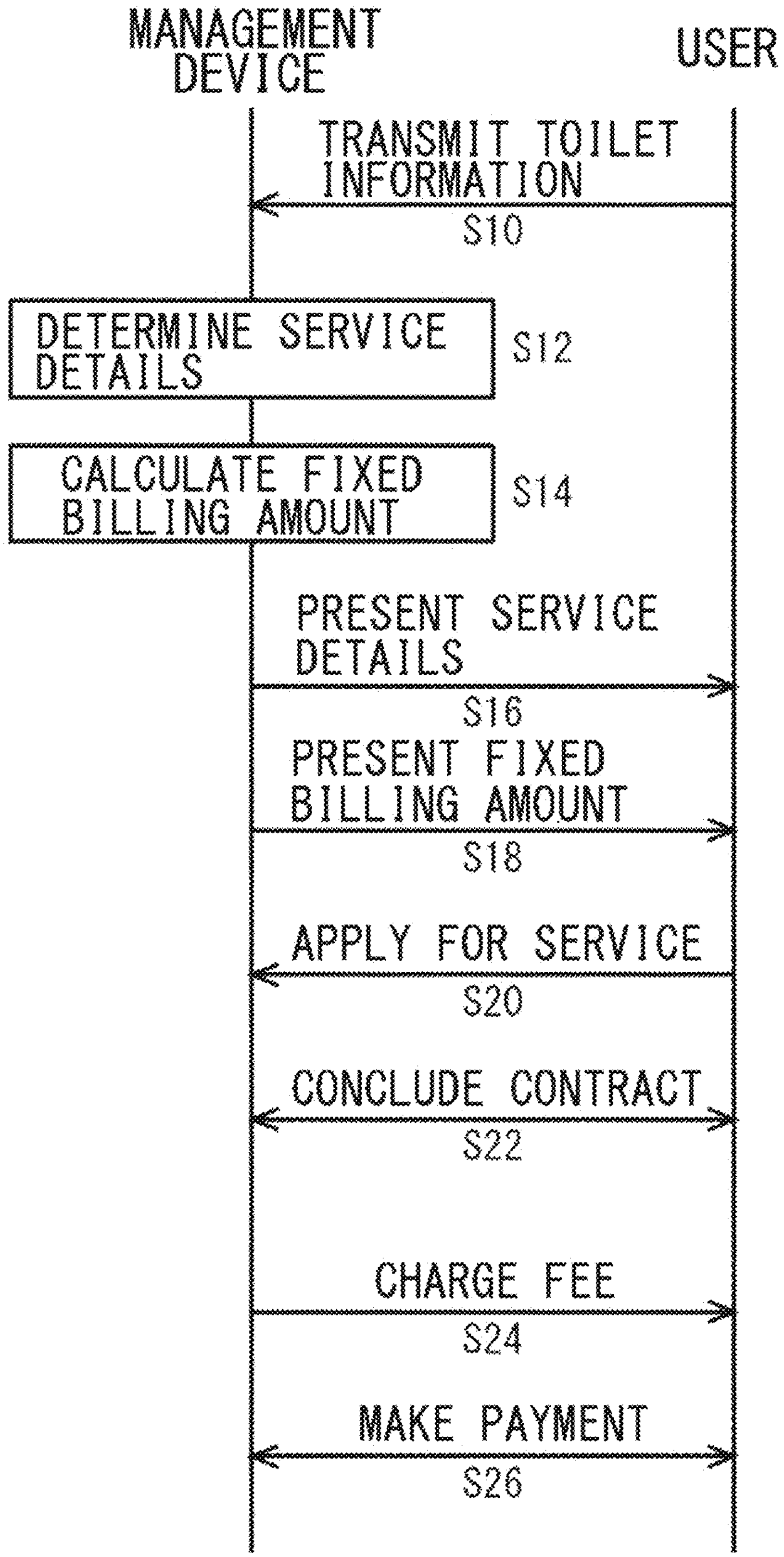
FIG. 2 is a sequence diagram showing the procedure of a management method according to the embodiment.

FIG. 2 is a sequence diagram showing the procedure of a management method according to the embodiment. A service user such as an owner or manager of the facility 20 transmits information on the toilet bowl devices 30 installed in the facility 20 and information on the installation location of the toilet bowl devices 30 to the management device 50 (S10). The information on the toilet bowl devices 30 includes the manufacturer, model, installation time, usage status, inspection results, repair results, replacement results, cleaning results, and the like of the toilet bowl devices 30. The information on the installation location of the toilet bowl devices 30 includes, for example, the type, number, size, and usage status of the facility 20 in which the toilet bowl devices 30 are installed, the number, size, and usage status of restrooms 21, and the attributes and number of persons who are expected to use the toilet bowl devices 30 in the facility 20. The type of the facility 20 is, for example, a commercial facility, an entertainment facility, a medical facility, an accommodation facility, an exercise facility, or the like used by an unspecified number of people, or an office, a residential facility, or the like used by a specified number of people. The information on the toilet bowl devices 30 may be an image obtained by imaging the toilet bowl devices 30 and the restroom 21. In this case, the management device 50 may acquire information such as the manufacturer, model, installation time, and usage status of the toilet bowl devices 30 by analyzing the image.

The management device 50 determines the details of a service provided to a service user based on the information on the toilet bowl devices 30, information on the installation location of the toilet bowl devices 30, and the like that have been acquired (S12). For example, the management device 50 may increase the frequency of inspection and cleaning of the toilet bowl devices 30 or propose early replacement when many years have passed since the installation of the toilet bowl devices 30, when the frequency of use of the toilet bowl devices 30 is high, when the toilet bowl devices 30 has not been sufficiently inspected and cleaned, or when the repair and replacement of the toilet bowl devices 30 have been performed many times.

The management device 50 calculates a billing amount for a service by which the toilet bowl devices 30 are managed for a fixed fee for a predetermined period of time based on the determined details of the service, the information on the toilet bowl devices 30, the information on the installation location of the toilet bowl devices 30, and the like (S14). For example, the management device 50 may calculate the billing amount by predicting the life of the toilet bowl devices 30 based on this information and estimating the cost required to replace the toilet bowl devices 30. Further, the management device 50 may calculate the billing amount based on the number of workers, time, details, frequency, and the like for the inspection and cleaning of the toilet bowl devices 30. The management device 50 may calculate the billing amount based further on the cost of consumables used when using the toilet bowl devices 30, for example, toilet paper, soap, cleaning solution, disinfectant, paper towels, and the like. The billing amount may include a rental fee for the toilet bowl devices 30, a fee for using an application for supporting the cleaning or maintenance of the toilet bowl devices 30, and the like.

The management device 50 may calculate the billing amount based on the calculation standard for calculating the billing amount. The calculation standard is, for example, the type, number, size, and usage status of the facility 20 in which the toilet bowl devices 30 are installed, the number, size, and usage status of restrooms 21, the attributes and number of persons who are expected to use the toilet bowl devices 30 in the facility 20, the type and number of toilet bowl devices 30 to be rented, the predicted usage status of the toilet bowl devices 30, and the like. The calculation standard may be, for example, a mathematical formula for calculating the billing amount by substituting these values, a table in which these pieces of information and the billing amount are stored in association with each other, or an algorithm such as a neural network that inputs these pieces of information and outputs the billing amount. The calculation standard may be determined based on the past usage status of toilet bowl devices installed in restrooms of various facilities, the results of the cleaning, replacement, and maintenance of the toilet bowl devices, the actual cost required for the cleaning, replacement, maintenance, etc., of the toilet bowl devices, and the like.

The management device 50 presents the determined details of the service to the user terminal 44 (S16) and also presents the calculated billing amount to the user terminal 44 (S18).

The service user checks the details of the service and the billing amount presented by the management device 50 and determines whether or not to receive the service. When the service user receives the service, the user applies for the reception of the service from the user terminal 44 to the management device 50 (S20). The management device 50 concludes a service provision contract with the service user (S22).

The management device 50 charges the service user a fixed billing amount for each predetermined period (S24). The service user pays the charged billing amount to the service provider (S26).

Figure 3:
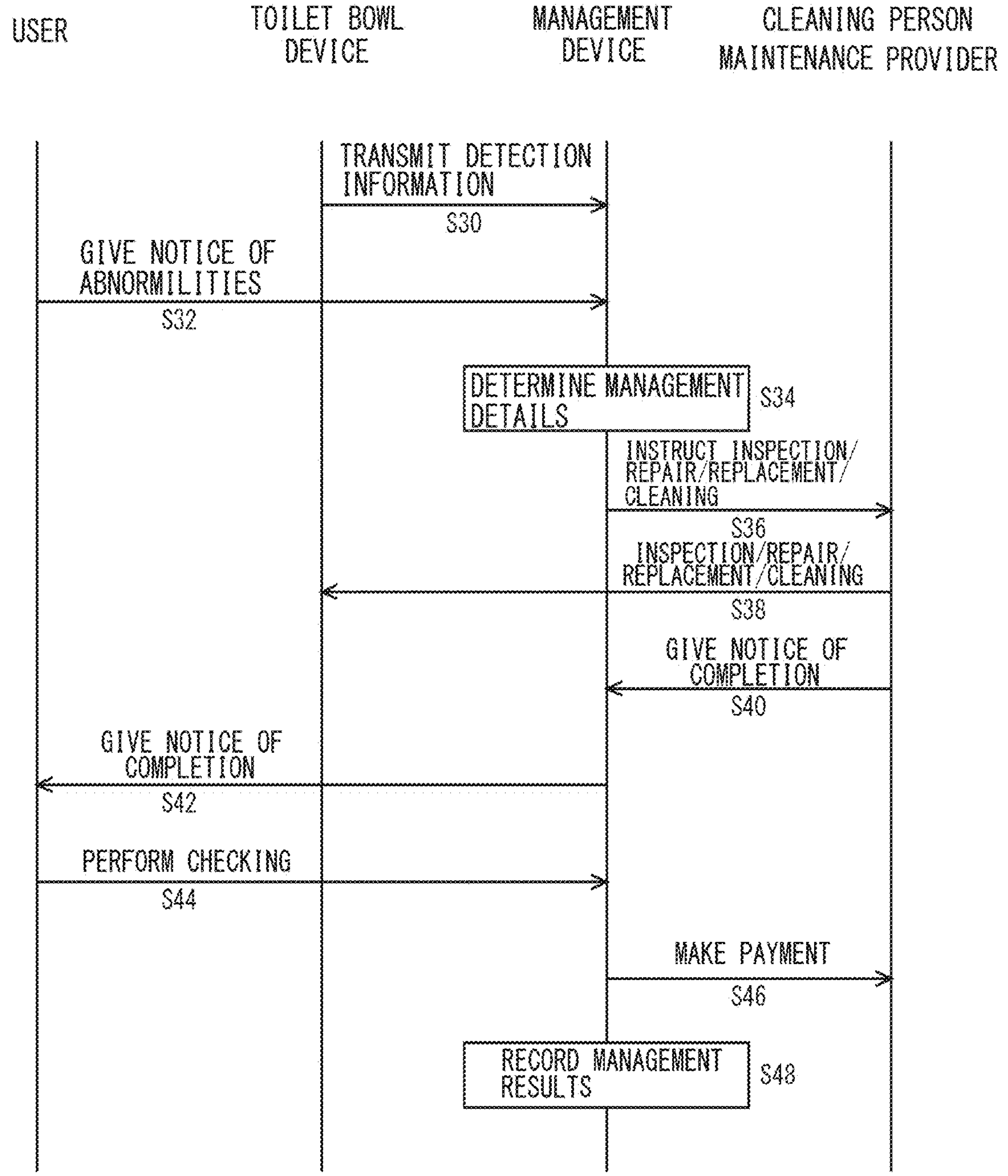
FIG. 3 is a sequence diagram showing the procedure of a management method according to the embodiment.

FIG. 3 is a sequence diagram showing the procedure of a management method according to the embodiment. The communication device 22 installed in the restroom 21 of the facility 20 transmits detection information detected by the toilet bowl devices 30, the sensor 33, and the like to the management device 50 (S30). The detection information may include, for example, information indicating the usage status of the toilet bowl devices 30, information indicating the operation status of the controller 31, information indicating the opening/closing status of the door detected by an opening/closing sensor installed in the door 23 of the restroom 21 or the door 25 of a private stall 24, information indicating the usage status or condition of equipment or devices such as lighting, ventilation fan, paper holder, etc., installed inside or outside the restroom 21, information detected by sensors such as a motion sensor, a temperature sensor, and an odor sensor installed inside or outside the restroom 21, information detected by sensors such as a seating sensor, a temperature sensor, and a water level sensor provided in a toilet bowl device 30, an image captured by an imaging device installed inside or outside the restroom 21, an audio acquired by a microphone installed inside or outside the restroom 21, and the number of sittings, the number of flushes, the number of clogging, the odor index, the dirt index, etc., obtained by analyzing these pieces of information.

When an abnormality occurs in the toilet bowl devices 30 or the restroom 21, the service user notifies the management device 50 of the occurrence of the abnormality (S32). The management device 50 may automatically detect an abnormality in the toilet bowl devices 30 or the restroom 21 based on the detection information.

The management device 50 determines the details of the inspection, repair, replacement, and cleaning to be performed in order to manage the toilet bowl devices 30 based on the information acquired in advance regarding the toilet bowl devices 30, the restroom 21, the facility 20, and the like, the detection information, information on abnormalities as notified by the service user, and requests from the service user (S34). When a malfunction occurs in a toilet bowl device 30, the management device 50 determines whether to repair the toilet bowl device 30 in which the malfunction occurred, replace the parts of the toilet bowl device 30, or replace the toilet bowl device 30. The management device 50 instructs the determined details to the manufacturer, the maintenance provider, the cleaning person, and the like of the toilet bowl device 30 (S36).

The manufacturer, maintenance provider, cleaning person, or the like of the toilet bowl device 30 performs inspection, repair, replacement, cleaning, or the like according to the details instructed by the management device 50 (S38). When the manufacturer, maintenance provider, cleaning person, or the like completes the inspection, repair, replacement, cleaning, etc. of the instructed contents, the management device 50 is notified to that effect (S40).

The management device 50 refers to the detection information so as to confirm that a task for the instructed details has been performed and notifies the service user of the completion of the task (S42). The service user inspects the toilet bowl device 30 and the restroom 21, and when it is confirmed that the abnormality has been resolved, the service user notifies the management device 50 that the abnormality has been resolved (S44). The management device 50 pays compensation to the manufacturer, the maintenance provider, the cleaning person, or the like (S46). This compensation is included in the fixed billing amount and is therefore not charged to the service user.

The management device 50 records information on the abnormality that occurred and the details of the performed management as management results (S48). These management results are referred to at the time of determining the details of the next and subsequent management, at the time of updating the fixed billing amount to the service user, or the like.

Figure 4:
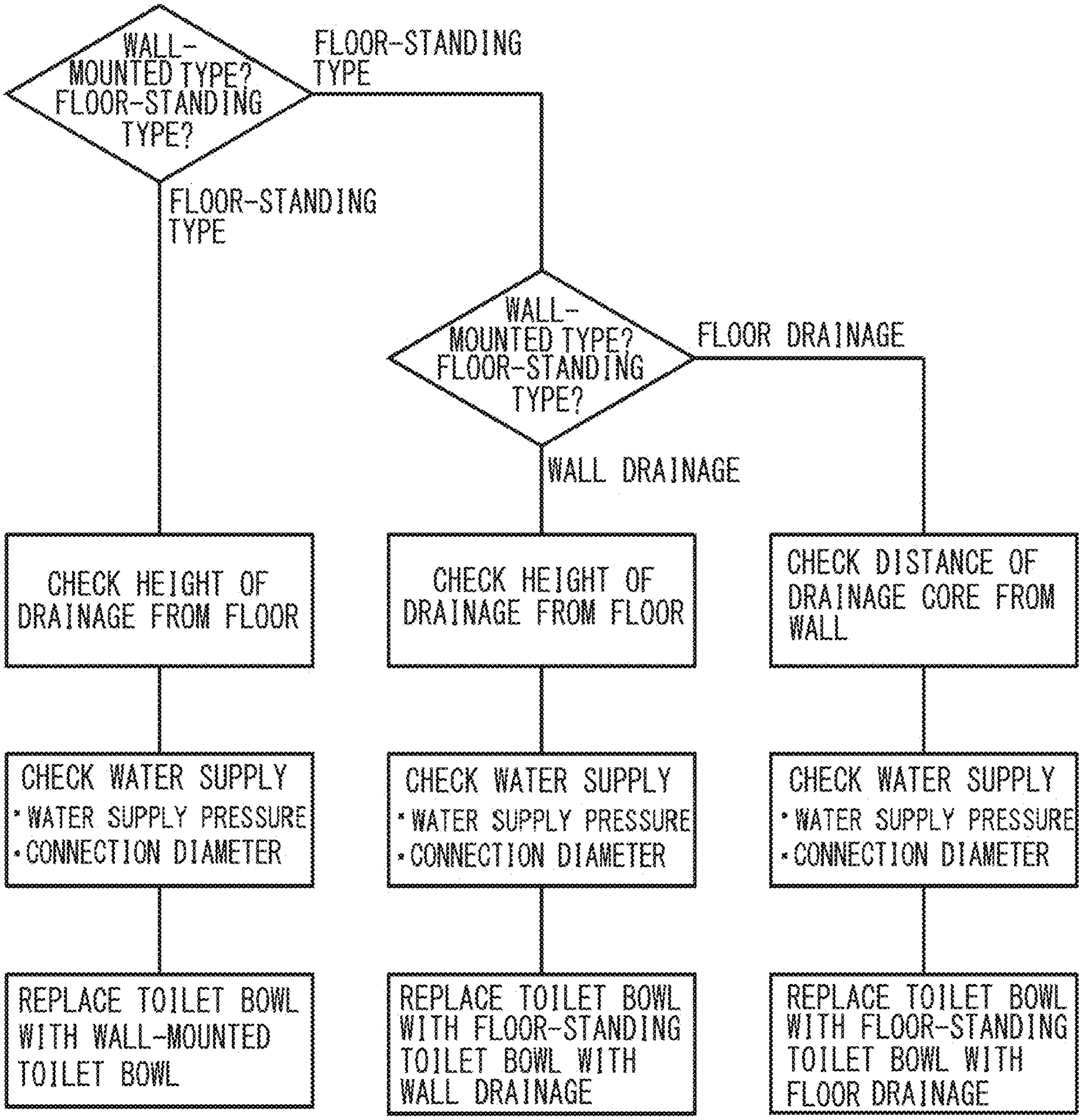
FIG. 4 is a flowchart showing an example of a procedure for determining management details in S34 in FIG. 3.

FIG. 4 is a flowchart showing an example of a procedure for determining management details in S34 in FIG. 3. FIG. 4 shows a procedure for replacing a ceramic portion of the main body of a toilet bowl device 30. The management device 50 refers to information on the toilet bowl device 30 acquired in advance, and checks whether the toilet bowl device 30 in which an abnormality has occurred is a wall-mounted type, a floor-standing type with wall drainage, or a floor-standing type with floor drainage. Then, the management device 50 selects a model for the toilet bowl device 30 to be replaced with reference to a database containing information on available toilet bowl devices 30.

Figure 5:
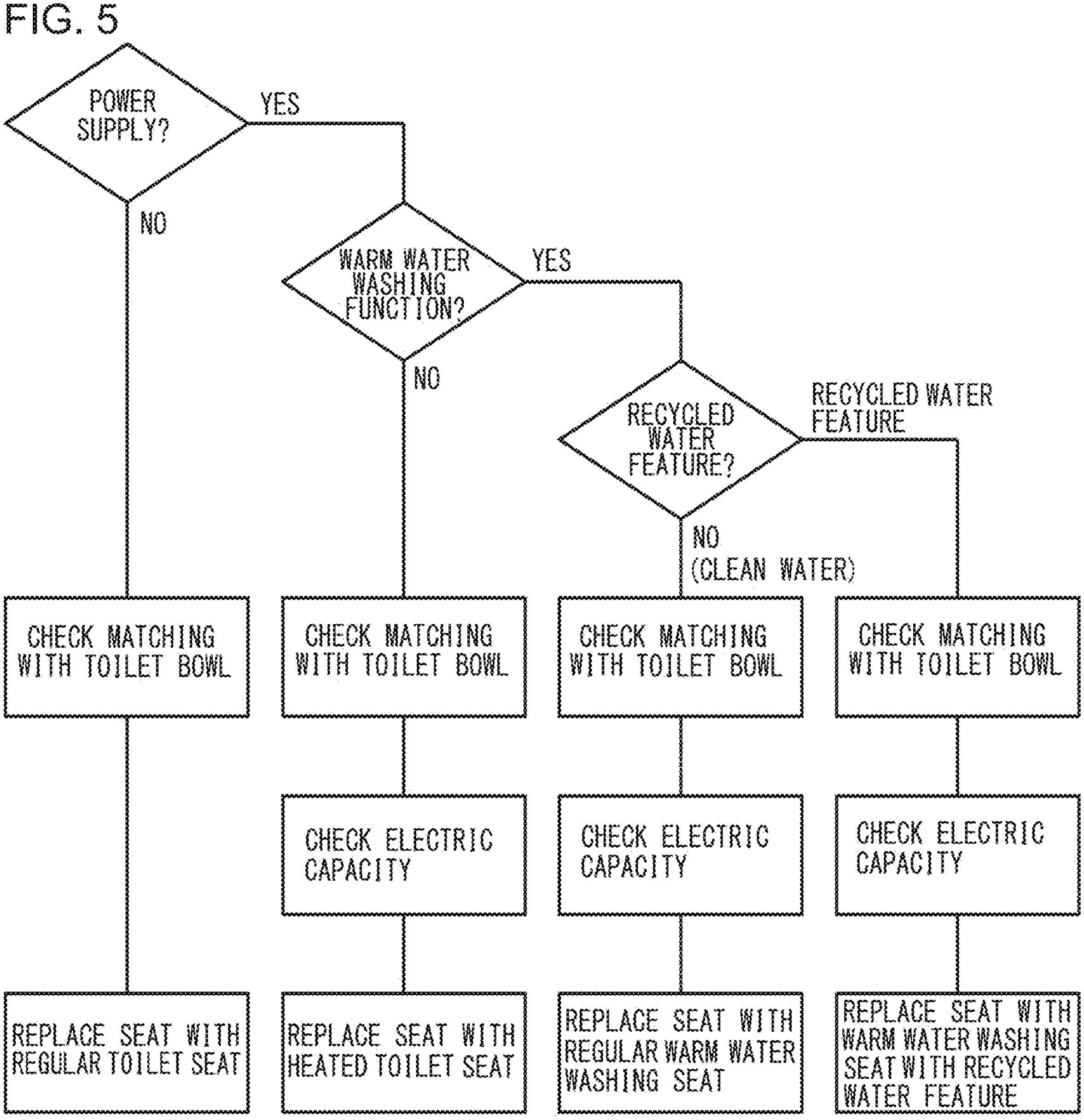
FIG. 5 is a flowchart showing an example of a procedure for determining management details in S34 in FIG. 3.

FIG. 5 is a flowchart showing an example of a procedure for determining management details in S34 in FIG. 3. FIG. 5 shows a procedure for replacing a toilet seat portion of a toilet bowl device 30. The management device 50 refers to information on the toilet bowl device 30 and the restroom 21 acquired in advance so as to check whether there is a power supply in a private stall 24 of the restroom 21 in which the toilet bowl device 30 is installed, whether the toilet bowl device 30 has a warm water washing function, and whether the toilet bowl device 30 has a recycled water feature and to check the combination of the toilet seat and the toilet bowl device 30, the electric capacity in the restroom 21, and the like. The management device 50 then selects the type of the toilet seat to be replaced with reference to a database containing information on available toilet seats.

When all or part of the toilet bowl device 30 is to be replaced, the management device 50 may proceed with replacement with those of a toilet bowl device 30 manufactured by a specific manufacturer. If toilet bowl devices 30 manufactured by multiple manufacturers coexist in the facility 20, maintenance will be requested to a different contact for each manufacturer of the toilet bowl devices 30 in which abnormalities have occurred, which is time-consuming. However, replacing the toilet bowl devices 30 with those manufactured by a specific manufacturer allows for unification of the toilet bowl devices 30 to be those manufactured by the specific manufacturer, and the time and effort of management can thus be reduced. The management device 50 may proceed with replacement with a toilet bowl device 30 of a specific model. Thereby, the time and effort of management can be further reduced.

Figure 6:
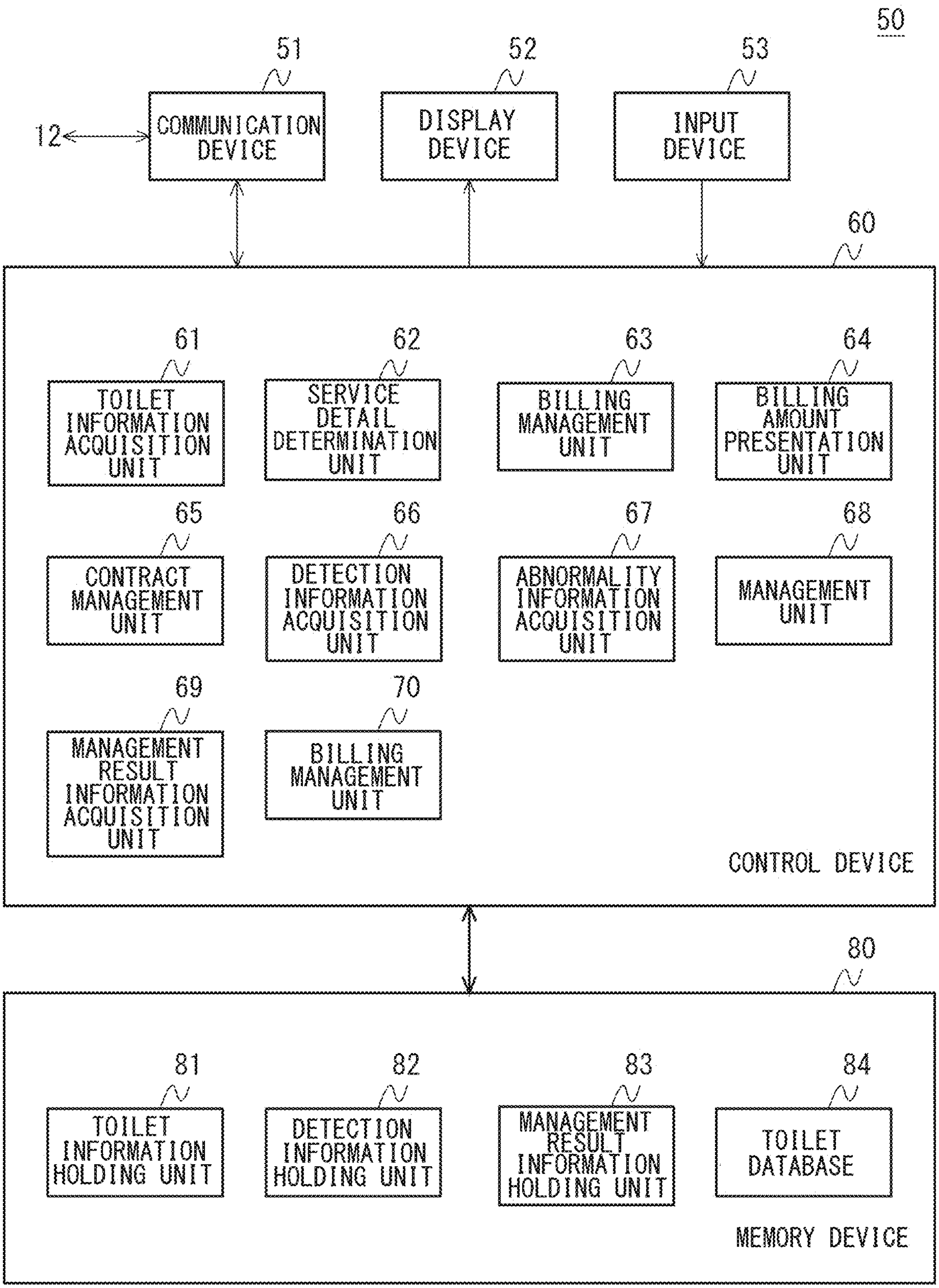
FIG. 6 is a diagram showing the configuration of a management device according to the embodiment.

FIG. 6 shows the configuration of a management device 50 according to the embodiment. The management device 50 includes a communication device 51, a display device 52, an input device 53, a memory device 80, and a control device 60. The management device 50 may be a server device, a device such as a personal computer, or a portable terminal such as a cell phone terminal, a smart phone, a tablet terminal, or the like.

The communication device 51 controls communication between other devices. The communication device 51 may communicate by any wired or wireless communication method. The communication device 51 communicates with the communication device 22 via the Internet 12 and receives detection information detected by the sensor 33. The communication device 51 also communicates with the manufacturer terminal 40, the cleaning person terminal 42, the user terminal 44, and the maintenance provider terminal 46 via the Internet 12.

The display device 52 displays a screen generated by the control device 60. The display device 52 may be a liquid crystal display device, an organic EL display device, or the like. The input device 53 transmits instruction input from the user of the management device 50 to the control device 60. The input device 53 may be a mouse, a keyboard, a touchpad, or the like. The display device 52 and the input device 53 may be implemented as a touch panel.

The memory device 80 stores programs, data, and the like used by the control device 60. The memory device 80 may be a semiconductor memory, a hard disk, or the like. The memory device 80 stores a toilet information holding unit

81, a detection information holding unit 82, a management result information holding unit 83, and a toilet database 84.

The toilet information holding unit 81 holds information on the toilet bowl devices 30, the restroom 21 in which the toilet bowl devices 30 are installed, the facility 20, and the like. The toilet information holding unit 81 stores the manufacturer, model, installation time, usage status, inspection results, repair results, replacement results, and cleaning results of the toilet bowl devices 30, the type, number, size, and usage status of the facility 20 in which the toilet bowl devices 30 are installed, the number, size, and usage status of restrooms 21, and the attributes and number of persons who are expected to use the toilet bowl devices 30 in the facility 20.

The detection information holding unit 82 holds detection information detected by the sensor 33. The detection information holding unit 82 stores information indicating the usage status of the toilet bowl devices 30, information indicating the operation status of the controller 31, information indicating the opening/closing status of the door detected by an opening/closing sensor installed in the door 23 of the restroom 21 or the door 25 of a private stall 24, information indicating the usage status or condition of equipment or devices such as lighting, ventilation fan, paper holder, etc., installed inside or outside the restroom 21, information detected by sensors such as a motion sensor, a temperature sensor, and an odor sensor installed inside or outside the restroom 21, information detected by sensors such as a seating sensor, a temperature sensor, and a water level sensor provided in a toilet bowl device 30, an image captured by an imaging device installed inside or outside the restroom 21, an audio acquired by a microphone installed inside or outside the restroom 21, and the number of sittings, the number of flushes, the number of clogging, the odor index, the dirt index, etc., obtained by analyzing these pieces of information.

The management result information holding unit 83 holds information indicating results of inspection, repair, replacement, cleaning, and the like of the toilet bowl devices 30. The management result information holding unit 83 stores the details, date and time of occurrence, and status of a malfunction that occurred in the toilet bowl devices 30 or the restroom 21, the implementation date and time, details, and costs of the inspection, repair, replacement, or cleaning of the toilet bowl devices 30 or the restroom 21, comments by an implementer, and the like.

The toilet database 84 stores information on the toilet bowl devices 30. The toilet database 84 stores the manufacturer, date of manufacture, model, features, installation conditions, price, deliverable date, and the like of the toilet bowl devices 30.

The control device 60 includes a toilet information acquisition unit 61, a service detail determination unit 62, a billing management unit 63, a billing amount presentation unit 64, a contract management unit 65, a detection information acquisition unit 66, an abnormality information acquisition unit 67, a management unit 68, and a management result information acquisition unit 69. These configurations are implemented in hardware by any CPU of a computer, memory, other LSI's, or the like and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only or the combination of hardware and software.

The toilet information acquisition unit 61 acquires information on the toilet bowl devices 30, information on the location where the toilet bowl devices 30 are installed, and the like from the user terminal 44 and stores those pieces of information in the toilet information holding unit 81.

The service detail determination unit 62 determines the details of the service provided to the service user based on the information stored in the toilet information holding unit 81.

The billing management unit 63 calculates an billing amount for a service by which the toilet bowl devices 30 are managed for a fixed fee for a predetermined period of time based on the determined details of the service, the information on the toilet bowl devices 30, the information on the installation location of the toilet bowl devices 30, and the like. The billing management unit 63 may calculate, for example, a fixed billing amount on a monthly, quarterly, semi-annual, or annual basis. Thereby, the service user can cover the cost required for installation and maintenance and management of the toilet bowl devices 30 for a fixed fee, and the operation risk can thus be reduced.

The billing amount presentation unit 64 presents the determined details of the service to the user terminal 44 and also presents the calculated billing amount to the user terminal 44.

The contract management unit 65 concludes a service provision contract with the service user. The billing management unit 63 charges the service user a fixed billing amount for each predetermined period.

The detection information acquisition unit 66 acquires detection information detected by the toilet bowl devices 30, the sensor 33, or the like and stores the detection information in the detection information holding unit 82.

The abnormality information acquisition unit 67 acquires information indicating that an abnormality has occurred in the toilet bowl devices 30 or the restroom 21. The abnormality information acquisition unit 67 may acquire information indicating that an abnormality has occurred from the user terminal 44, or may detect an abnormality based on the information stored in the detection information holding unit 82.

Based on the information held in the toilet information holding unit 81, the detection information held in the detection information holding unit 82, the information on abnormalities acquired from the user terminal 44, requests from the service user, or the like, the management unit 68 determines the details of the inspection, repair, replacement, or cleaning to be carried out to manage the toilet bowl devices 30 and instructs the manufacturer terminal 40, the cleaning person terminal 42, the maintenance provider terminal 46, or the like to perform the determined details.

The management result information acquisition unit 69 acquires result information indicating the details of a task performed from the person in charge who inspected, repaired, replaced, or cleaned the toilet bowl devices 30 or the restroom 21, and records the information on abnormalities that occurred and the result information in the management result information holding unit 83. The billing management unit 63 pays compensation for the task to the manufacturer, the maintenance provider, the cleaning person, or the like.

When the service provision period is updated, the service detail determination unit 62 may determine the details of the service in the next period based on the management results and detection information up to that point. The billing management unit 63 may calculate a fixed billing amount for the next period based on the management results, the detection information, the details of the service determined by the service detail determination unit 62, and the like obtained thus far. The billing amount presentation unit 64 presents the details of the service for the next period and the newly calculated billing amount to the user terminal 44. If the user agrees to the details of the service and the new billing amount, the contract management unit 65 concludes a service provision contract for the next period. Thereby, the usage status and management results of the toilet bowl devices 30 can be reflected in the billing amount, and the operation risk of the service provider can thus be reduced.

While the present disclosure has been described based on the embodiment, the embodiment is merely illustrative of the principles and applications of the present disclosure. Additionally, many variations and changes in arrangement may be made in the embodiment without departing from the spirit of the present disclosure as defined by the appended claims.

In the embodiment, an example of managing toilet bowl devices installed in a restroom of an institution is explained. However, the technology of the present embodiment is also applicable to managing toilets in general residences or public toilets installed in parks or on streets. The technology according to the present embodiment is also applicable to managing facilities and equipment such as faucets and automatic soap dispensers installed in restrooms. Further, the management system 10 according to the present disclosure is also capable of managing urinals in the same manner as toilet bowl devices.

In the embodiment, an example of managing the cleaning, replacement, or maintenance of existing toilet bowl devices owned by a service user has been described. However, the technology according to the present embodiment is also applicable to a case where toilet bowl devices are sold or lent to service users and the cleaning, replacement, or maintenance of the sold or lent toilet bowl devices is managed.

The invention claimed is:

1. A management device comprising:

a controller that acquires information on a toilet bowl device or an installation location of the toilet bowl device, wherein the controller acquires information comprising at least one of a type, number, size, position, and usage status of the installation location, an attribute and number of users of the toilet bowl device, a manufacturer, model, functions, features, installation time, number of installations, usage status, cleaning results, inspection results, repair results, and replacement results of the toilet bowl device, manages at least one of inspection, repair, and replacement of the toilet bowl device based on the information acquired:

manages billing for a service comprising at least one selected from the group consisting of the following: inspection, repair, replacement, and cleaning of the toilet bowl device at a fixed fee for a predetermined period of time;

determines details of at least one selected from the group consisting of the following: inspection, repair, replacement, and cleaning of the toilet bowl device to be performed in the predetermined period of time based on the information;

calculates a billing amount for the service based on the information or for the details determined; and updates the billing amount for the service based on at least one selected from the group consisting of the following: results of the inspection, repair, replacement, or cleaning of the toilet bowl device in the service; a continuous period of time for providing the service; the predetermined period of time; and the usage status of the toilet bowl device.

2. The management device of claim 1, wherein the controller presents the details of the service and the billing amount.

3. The management device of claim 1, wherein the controller acquires detection information detected by a sensor installed in the toilet bowl device or at the installation location, and manages at least one selected from the group consisting of the following: the inspection, repair, replacement, and cleaning of the toilet bowl device based on the detection information acquired.

4. The management device of claim 3, wherein when a malfunction occurs in the toilet bowl device, the controller determines whether to repair the toilet bowl device in which the malfunction occurred, replace parts of the toilet bowl device, or replace the toilet bowl device based on the information or the detection information.

5. The management device of claim 1, wherein when the toilet bowl device is to be replaced, the controller proceeds with replacement with a toilet bowl device manufactured by a specific manufacturer or a toilet bowl device of a specific model.

6. A non-transitory computer readable medium storing a management program causing a computer to implement a controller that acquires information on a toilet bowl device or an installation location of the toilet bowl device, wherein the controller acquires information comprising at least one of a type, number, size, position, and usage status of the installation location, an attribute and number of users of the toilet bowl device, a manufacturer, model, functions, features, installation time, number of installations, usage status, cleaning results, inspection results, repair results, and replacement results of the toilet bowl device, manages at least one of inspection, repair, and replacement of the toilet bowl device based on the information acquired;

manages billing for a service comprising at least one selected from the group consisting of the following: inspection, repair, replacement, and cleaning of the toilet bowl device at a fixed fee for a predetermined period of time;

determines details of at least one selected from the group consisting of the following: inspection, repair, replacement, and cleaning of the toilet bowl device to be performed in the predetermined period of time based on the information;

calculates a billing amount for the service based on the information or for the details determined; and updates the billing amount for the service based on at least one selected from the group consisting of the following: results of the inspection, repair, replacement, or cleaning of the toilet bowl device in the service; a continuous period of time for providing the service; the predetermined period of time; and the usage status of the toilet bowl device.

* * * * *